(12) United States Patent
Kröhnke et al.

(10) Patent No.: US 7,105,590 B2
(45) Date of Patent: Sep. 12, 2006

(54) PHENOLFREE STABILIZATION OF POLYOLEFINS

(75) Inventors: Christoph Kröhnke, Breisach (DE); Peter Staniek, Binzen (DE)

(73) Assignee: Clariant Finance (BVI) Limited, Tortola (VG)

( * ) Notice: Subject to any disclaimer, the term of this patent is extended or adjusted under 35 U.S.C. 154(b) by 33 days.

(21) Appl. No.: 10/486,133

(22) PCT Filed: Aug. 5, 2002

(86) PCT No.: PCT/IB02/03062

§ 371 (c)(1), (2), (4) Date: Feb. 5, 2004

(87) PCT Pub. No.: WO03/014213

PCT Pub. Date: Feb. 20, 2003

(65) Prior Publication Data

US 2004/0186207 A1    Sep. 23, 2004

(30) Foreign Application Priority Data

Aug. 6, 2001  (GB)  ................................. 0119136.0

(51) Int. Cl.
*C08K 5/3435* (2006.01)
*C08K 5/50* (2006.01)
*C08K 5/1535* (2006.01)

(52) U.S. Cl. ........................ 524/99; 524/100; 524/111; 524/121; 524/154; 252/400.24; 252/405; 252/407

(58) Field of Classification Search .......... 524/99–100, 524/111, 121, 154; 252/400.24, 405, 407
See application file for complete search history.

(56) References Cited

U.S. PATENT DOCUMENTS

| | | | |
|---|---|---|---|
| 5,616,636 A | 4/1997 | Avar et al. | |
| 5,969,014 A | 10/1999 | Webster et al. | 524/100 |
| 6,153,676 A | 11/2000 | Avar et al. | 524/102 |
| 6,310,220 B1 * | 10/2001 | Schmitter et al. | 549/307 |
| 6,593,485 B1 | 7/2003 | Stoll et al. | 588/71 |
| 6,680,350 B1 * | 1/2004 | Dobler | 524/88 |

FOREIGN PATENT DOCUMENTS

| | | |
|---|---|---|
| GB | 2315070 | 1/1998 |
| GB | 2322374 | 8/1998 |

OTHER PUBLICATIONS

Klemchuk et al., "Transformation Products of Hindered Phenolic Antioxidants and Colour Development in Polyolefins," Polymer Degradation and Stability, vol. 34 Nos. 1-3, pp. 333-346 (1991).
Gachter et al., "Plastics Additives Handbook," 3$^{rd}$ Ed., pp. 1-105 (1990).

* cited by examiner

*Primary Examiner*—Peter Szekely
(74) *Attorney, Agent, or Firm*—Anthony A. Bisulca

(57) ABSTRACT

The instant invention relates to stabilizer compositions for thermoplastic polymers comprising a) at least one organophosphine, b) at least one 2-phenylbenzofuranone, and c) at least one sterically hindered piperidine based stabilizer (HAS), wherein the weight ratio of component a) to component b) to component c) is from 1:0.05:0.5 to 1:3:5. The instant compositions need an overall lower concentration as compared with the conventional phenol-containing formulations. In polyolefin articles, particularly in polyolefin-fibers, discoloration during processing and service life by both the formation of quinoid products and by action of NOx gases (gasfading) is avoided.

11 Claims, No Drawings

PHENOLFREE STABILIZATION OF POLYOLEFINS

The instant invention relates to stabilizing compositions which are free from phenolic antioxidants for polyolefins, especially for polypropylene.

Polyolefin-articles and especially polyolefin-fibers are among the most typical examples demonstrating the need of stabilization for the successful use of synthetic raw materials. Polypropylene requires protection during its entire life cycle. Particularly polypropylene fibers need special attention since processing takes usually place at higher temperatures as applied for other polypropylene articles, typically at 270–300° C.

Conventional stabilization packages consist of phenolic antioxidants used in combination with organo-phosphites and -phosphonites to provide adequate processing stability and to ensure long-term protection against thermooxidative degradation. For the latter phosphites and phosphonites do not contribute significantly.

Since many years it is known from the literature that piperidine-based stabilizers (HAS), particularly high molecular mass HAS contribute to long term heat protection of polypropylene. Usually the time to failure of polypropylene fibers increases with the HAS concentration in a non-linear manner.

On the other hand it is well known that discoloration of polymers containing sterically hindered phenolic antioxidants, which are used as primary antioxidants for long-term heat protection, takes place by formation of colored transformation products of these additives containing quinoid structures. Its extent depends on structure and consumption of phenols. Generally, discoloration of polyolefins is particularly pronounced by continuous contact with water or $NO_x$-gases (F. Gugumus, chapter "Antioxidants" in Plastics Additives, editors R. Gächter and H. Müller, Hanser Publishers, Munich, Vienna, New York, 3$^{rd}$ edition, pages 1–104 (1990) and P. P. Klemchuk and P.-L. Horng, Polym. Degrad. Stab., Vol. 34, pp. 333 (1991)).

These effects and observations initiated new stabilization concepts to abandon sterically hindered phenols from use for stabilization of polyolefins and especially of polypropylene fibers. New generation of stabilizers are now commercially available which allow processing at high temperatures as applied for the manufacture of polypropylene fibers.

Known are stabilizer systems, which consist of an organophosph(on)ite, a benzofuranone-based, component and piperidine-based HAS compounds for phenol-free stabilization purposes. GB-A-2 315 070 discloses stabilizer mixtures for organic material comprising at least one compound of the benzofuran-2-one type and at least one compound of the sterically hindered amine type, an organic phosphite or phosphonite may also be included in the stabilizer mixture.

It is the object of the present invention to provide an improved stabilizer composition for the stabilization of polyolefin polymers wherein phenolic antioxidants are not necessary.

This object is achieved with the stabilizer composition as hereunder described. It has now been found that appropriate phenol-free stabilizer systems used in a certain ratio as defined below fulfill the given technical requirements for processing of polyolefins, particularly for processing of polyolefin fibers under distinct improvement of maintenance of both the molecular weight as well as of color if compared against conventional phenol-containing stabilizer formulations.

These additive systems consist basically of an organophosphine and a 2-phenylbenzofuranone ("lactone") and a sterically hindered piperidine-based stabilizer (HAS).

Accordingly the present invention provides a stabilizer composition comprising a) at least one organophosphine, b) at least one 2-phenylbenzofuranone, and c) at least one sterically hindered piperidine based stabilizer (HAS), wherein the weight ratio of component a) to component b) to component c) is from 1:0.05:0.5 to 1:3:5.

Preferably the invention provides a stabilizer composition comprising a) at least one compound of the formulae (I) to (IV) [herein below referred to as component a)]

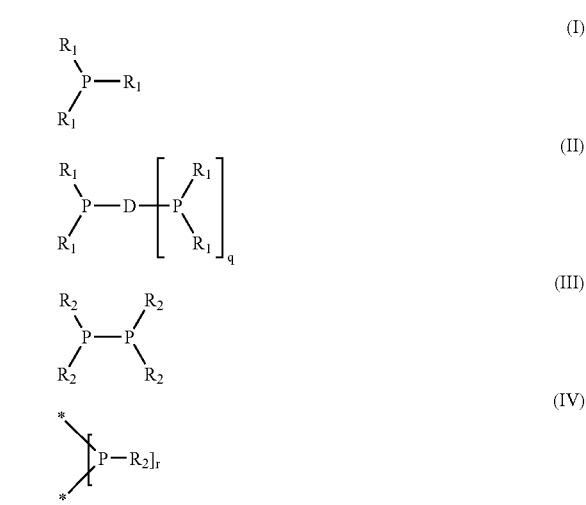

in which independently of one another $R_1$ is $C_{1-24}$-alkyl or $C_{1-24}$-N,O,P,S-heteroalkyl; $C_{5-30}$-cycloalkyl or $C_{5-30}$-N,O,P,S-heterocycloalkyl; $C_{7-30}$-alkylaryl; $C_{6-24}$-aryl; $C_{4-24}$-N,O,P,S-heteroaryl; $C_{6-24}$-aryl or $C_{4-24}$-N,O,P,S-heteroaryl mono- or polysubstituted by $C_{1-18}$-alkyl, $C_{5-12}$-cycloalkyl or by $C_{1-18}$-alkoxy groups;

$R_2$ is $C_{4-24}$-alkyl or $C_{4-24}$-N,O,P,S-heteroalkyl; $C_{5-30}$-cycloalkyl or $C_{5-30}$-N,O,P,S-heterocycloalkyl; $C_{7-30}$-alkylaryl; $C_{6-24}$-aryl; $C_{4-24}$-N,O,P,S-heteroaryl; $C_{6-24}$-aryl or $C_{4-24}$-N,O,P,S-heteroaryl mono- or polysubstituted by $C_{1-18}$-alkyl, by $C_{5-12}$-cycloalkyl or by $C_{1-18}$-alkoxy groups;

D is $C_{1-30}$-alkylene or $C_{1-30}$-N,O,P,S-alkylene, linear or branched; $C_{2-30}$-alkylidene or $C_{2-30}$-N,O,P,S-alkylidene; $C_{5-12}$-cycloalkylene or $C_{5-12}$-N,O,P,S-cycloalkylene; $C_{6-24}$-arylene or $C_{4-24}$-N,O,P,S-heteroarylene, unsubstituted or one- or morefold substituted by linear or branched $C_{1-18}$-alkyl, by $C_{5-12}$-cycloalkyl or by $C_{1-18}$-alkoxy; or —O—, —S—;

q is 1 to 5;

r is 3 to 6, where the groups P—$R_1$ in the formula (IV) are a component of a phosphacycle, indicated by * in the bonds originating from P;

b) at least one compound which can be described by the formula V (referred to as component b)

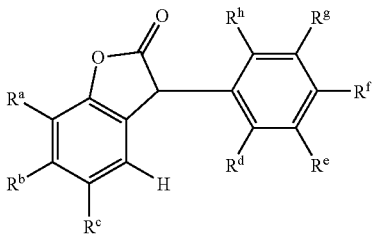

in which
R$^a$, R$^b$, R$^d$, R$^e$, R$^f$, R$^g$ and R$^h$ independently of one another are hydrogen; hydroxyl; C$_1$–C$_{18}$-alkyl; or phenyl which is unsubstituted or mono-, di- or tri-substituted by C$_1$–C$_4$-alkyl; are C$_7$–C$_9$-phenylalkyl, C$_1$–C$_{18}$-alkoxy or C$_5$–C$_{12}$-cycloalkyl unsubstituted or mono-, di- or trisubstituted by C$_1$–C$_4$-alkyl; and R$^c$ has one of the meanings given above for R$^a$, R$^b$, R$^d$, R$^e$, R$^f$, R$^g$ and R$^h$ or is a radical of the formula (VI)

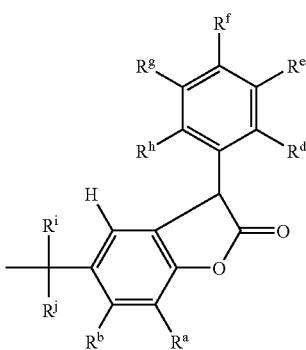

in which
R$^a$, R$^b$, R$^d$, R$^e$, R$^f$, R$^g$ and R$^h$ are as defined above and R$^i$ and R$^j$ independently of one another are hydrogen or C$_1$–C$_4$-alkyl, where at least two of the radicals R$^d$, R$^e$, R$^f$, R$^g$ and R$^h$ are hydrogen; and c) at least one sterically hindered amine of the formula VII (referred to as component c),

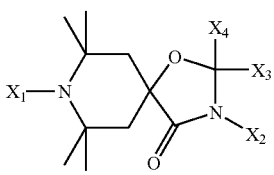

in which
X$_1$ is hydrogen; a C$_1$–C$_{22}$-alkyl group; an oxygen radical O*; —OH; —NO; —CH$_2$CN; benzyl; allyl; a C$_1$–C$_{30}$-alkoxy group; a C$_5$–C$_{12}$-cycloalkyloxy group; a C$_6$–C$_{10}$-aryloxy group; a C$_7$–C$_{20}$-arylalkyloxy group or a C$_7$–C$_{20}$-arylalkyloxy group where the aryl radical is substituted by a C$_1$–C$_5$-alkyl group or a halogen or a nitro group; a C$_3$–C$_6$-alkenyl group; a C$_3$–C$_6$-alkinyl group; a C$_1$–C$_{10}$-acyl group; halogen; an unsubstituted or C$_1$–C$_4$-alkyl-substituted phenyl radical;

X$_2$ is hydrogen; a [CH$_2$—CH$_2$—C(O)—O—X$_5$] radical; a [CH$_2$—C(CH$_3$)H—C(O)—O—X$_5$] radical; a C$_1$–C$_{22}$-alkyl group;

X$_3$ and X$_4$ independently of one another are hydrogen; an unsubstituted or C$_1$–C$_4$-alkyl-substituted phenyl radical; or a C$_1$–C$_{22}$-alkyl group, where at least one of the two radicals X$_3$ and X$_4$ is a branched C$_4$–C$_{22}$-alkyl group; and in which X$_5$ is a C$_1$–C$_{22}$-alkyl group.

The alkyl groups as mentioned above may be linear or branched.

Preference is given to components wherein

R$_1$ is C$_{8-24}$-alkyl or C$_{8-24}$-N,O,P,S-heteroalkyl; C$_{6-12}$-cycloalkyl or C$_{6-12}$-N,O,P,S-heterocycloalkyl; C$_{7-24}$-alkylaryl; C$_{6-16}$-aryl; C$_{4-18}$-N,O,P,S-heteroaryl; C$_{6-16}$-aryl or C$_{4-18}$-N,O,P,S-heteroaryl mono- or polysubstituted by C$_{1-12}$-alkyl, by C$_{5-8}$-cycloalkyl or by C$_{1-12}$-alkoxy groups;

R$_2$ is C$_{6-18}$-alkyl or C$_{6-18}$-N,O,P,S-heteroalkyl; C$_{5-12}$-cycloalkyl or C$_{5-12}$-N,O,P,S-heterocycloalkyl; C$_{7-18}$-alkylaryl; C$_{6-16}$-aryl; C$_{4-8}$-N,O,P,S-heteroaryl; C$_{6-16}$-aryl or C$_{4-18}$-N,O,P,S-heteroaryl mono- or polysubstituted by C$_{1-12}$-alkyl, by C$_{5-8}$-cycloalkyl or by C$_{1-12}$-alkoxy groups;

D is C$_{1-24}$-alkylene or C$_{1-24}$-N,O,P,S-alkylene, linear or branched; C$_{2-24}$-alkylidene or C$_{2-24}$-N,O,P,S-alkylidene; C$_{5-8}$-cycloalkylene or C$_{5-8}$-N,O,P,S-cycloalkylene; C$_{6-24}$-arylene or C$_{4-18}$-N,O,P,S-heteroarylene, unsubstituted or one- or morefold substituted by linear or branched C$_{1-18}$-alkyl, by C$_{5-8}$-cycloalkyl or by C$_{1-12}$-alkoxy; or —O—; —S—;

q is 1 to 4;

r is 4 or 5, where the groups P—R$_1$ in the formula (IV) are component of a phosphacycle, indicated by * in the bonds originating from P;

R$^a$, R$^b$, R$^d$, R$^e$, R$^f$, R$^g$ and R$^h$ independently of one another are hydrogen; hydroxyl; C$_1$–C$_{12}$-alkyl; or phenyl which is unsubstituted or mono-, di- or trisubstituted by C$_1$–C$_2$-alkyl; are C$_7$–C$_9$-phenylalkyl; C$_1$–C$_{12}$-alkoxy or C$_5$–C$_8$-cycloalkyl unsubstituted or mono-, di- or trisubstituted by C$_1$–C$_2$-alkyl; and R$^c$ has one of the meanings given above for R$^a$, R$^b$, R$^d$, R$^e$, R$^f$, R$^g$ and R$^h$ or is a radical of the formula (VI) in which R$^a$, R$^b$, R$^d$, R$^e$, R$^f$, R$^g$ and R$^h$ are as defined above and R$^i$ and R$^j$ independently of one another are hydrogen or C$_1$–C$_2$-alkyl, where at least two of the radicals R$^d$, R$^e$, R$^f$, R$^g$ and R$^h$ are hydrogen;

X$_1$ is hydrogen; a C$_1$–C$_5$-alkyl group; an oxygen radical O*; —OH; —NO; —CH$_2$CN; benzyl; allyl; a C$_1$–C$_{10}$-alkoxy group; a C$_5$–C$_6$-cycloalkyloxy group; a C$_6$–C$_7$-aryloxy group; a C$_7$–C$_{10}$-arylalkyloxy group or a C$_7$–C$_{10}$-arylalkyloxy group where the aryl radical is substituted by a C$_1$–C$_5$-alkyl group or a halogen or a nitro group; a C$_3$–C$_6$-alkenyl group; a C$_3$–C$_6$-alkinyl group; a C$_1$–C$_5$-acyl group; halogen; an unsubstituted or C$_1$–C$_2$-alkyl-substituted phenyl radical;

X$_2$ is hydrogen; a [CH$_2$—CH$_2$—C(O)—O—X$_5$] radical; a [CH$_2$—C(CH$_3$)H—C(O)—O—X$_5$] radical; a C$_1$–C$_{10}$-alkyl group;

X$_3$ and X$_4$ independently of one another are hydrogen; an unsubstituted or C$_1$–C$_2$-alkyl-substituted phenyl radical or a branched C$_4$–C$_{22}$-alkyl group, where at least one of the two radicals X$_3$ and X$_4$ is a branched C$_4$–C$_{10}$-alkyl group; and in which X$_5$ is a C$_{10}$–C$_{16}$-alkyl group.

Particular preference is given to compounds wherein $R_1$ is $C_{12-16}$-alkyl or $C_{12-16}$-N,O,P,S-heteroalkyl; $C_{6-8}$-cycloalkyl or $C_{6-8}$-N,O,P,S-heterocycloalkyl; $C_{7-12}$-alkylaryl; $C_{6-12}$-aryl or $C_{4-10}$-N,O,P,S-heteroaryl; $C_{6-12}$-aryl or $C_{4-10}$-heteroaryl mono- or polysubstituted by $C_{1-18}$-alkyl, by $C_{5-6}$-cycloalkyl or by $C_{1-8}$-alkoxy groups;

$R_2$ is $C_{8-18}$-alkyl or $C_{8-18}$-N,O,P,S-heteroalkyl; $C_{5-8}$-cycloalkyl or $C_{5-8}$-N,O,P,S-heterocycloalkyl; $C_{7-12}$-alkylaryl; $C_{6-12}$-aryl; $C_{4-10}$-N,O,P,S-heteroaryl; $C_{6-12}$-aryl or $C_{4-10}$-N,O,P,S-heteroaryl mono- or polysubstituted by $C_{1-8}$-alkyl, by $C_{5-6}$-cycloalkyl or by $C_{1-8}$-alkoxy groups;

D is $C_{1-18}$-alkylene or $C_{1-18}$-N,O,P,S-alkylene, linear or branched; $C_{2-18}$-alkylidene or $C_{2-18}$-N,O,P,S-alkylidene; $C_{5-8}$-cycloalkylene or $C_{5-8}$-N,O,P,S-cycloalkylene; $C_{6-18}$-arylene or $C_{4-18}$-N,O,P,S-heteroarylene, unsubstituted or one- or morefold substituted by linear or branched $C_{1-12}$-alkyl, by $C_{5-8}$-cycloalkyl or by $C_{1-8}$-alkoxy; or —O—; —S—;

q is 1 to 3;

r is 4 o 5, where the groups P—$R_1$ in the formula (IV) are component of a phosphacycle, indicated by * in the bonds originating from P, $R^a$, $R^b$, $R^d$, $R^e$, $R^f$, $R^g$ and $R^h$ independently of one another are hydrogen; hydroxyl; $C_1$–$C_6$-alkyl; or phenyl which is unsubstituted or mono-, di- or trisubstituted by $C_1$–$C_2$-alkyl; are $C_7$–$C_9$-phenylalkyl; $C_1$–$C_6$-alkoxy or $C_5$–$C_8$-cycloalkyl unsubstituted or mono-, di- or trisubstituted by $C_1$–$C_2$-alkyl; and $R^c$ has one of the meanings given above for $R^a$, $R^b$, $R^d$, $R^f$, $R^e$, $R^g$ and $R^h$ or is a radical of the formula (VI) in which $R^a$, $R^b$, $R^d$, $R^e$, $R^f$, $R^g$ and $R^h$ are as defined above and $R^i$ and $R^j$ independently of one another are hydrogen or $C_1$–$C_2$-alkyl, where at least two of the radicals $R^d$, $R^e$, $R^f$, $R^g$ and $R^h$ are hydrogen;

$X_1$ is hydrogen; a methyl group; an oxygen radical O*; —OH; —NO; —CH$_2$CN; benzyl; allyl; a $C_1$–$C_6$-alkoxy group; a $C_5$–$C_6$-cycloalkyloxy group; a $C_6$-aryloxy group; a $C_3$–$C_6$, alkenyl group; a $C_3$–$C_6$-alkinyl group; a $C_1$–$C_5$-acyl group; halogen; an unsubstituted or $C_1$–$C_2$-alkyl-substituted phenyl radical;

$X_2$ is hydrogen, a [CH$_2$—CH$_2$—C(O)—O—X$_5$] radical, a [CH$_2$—C(CH$_3$)H—C(O)—O—X$_5$] radical, a $C_1$–$C_4$-alkyl group;

$X_3$ and $X_4$ independently of one another are hydrogen, an unsubstituted or $C_1$–$C_2$-alkyl-substituted phenyl radical or a branched $C_4$–$C_6$-alkyl group, where at least one of the two radicals $X_3$ and $X_4$ is a branched $C_4$–$C_6$-alkyl group; and in which $X_5$ is a $C_{12}$–$C_{14}$-alkyl group.

Especially preferred is a stabilizer composition comprising
a) triphenylphosphine,
b) 2-phenylbenzofuranone and
c) polymer of epichlorhydrin and 2,2,4,4-tetramethyl-7-oxa-3,20-diaza-20-(2,3-epoxi-propyl)-dispiro-[5.1.11.2]-heneicosane-21-one, wherein the weight ratio of component a) to component b) to component c) is from 1:0.1:1 to 1:1:3.

Particularly suitable are the following representatives of the component a):

Component A)
triphenylphosphane
tris(2-methylphenyl)phosphane
tris(4-methylphenyl)phosphane
tris(2-methoxyphenyl)phosphane
tris(4-methoxyphenyl)phosphane
tetracyclohexylcyclotetraphosphane
tetratert-butylcyclotetraphosphane
tetrabiphenylcyclotetraphosphane
tetraphenylcyclotetraphosphane
pentaphenylcyclopentaphosphane
pentabiphenylylcyclopentaphosphane
tetraphenydiphosphane
tetracyclohexyldiphosphane
bis(diphenylphosphino)methane
1,2-bis(diphenylphosphino)ethane
1,3-bis(diphenylphosphino)propane
1,4-bis(diphenylphosphino)butane
1,5-bis(diphenylphosphino)pentane
1,6-bis(diphenylphosphino)hexane
1,8-bis(diphenylphosphino)octane
1,3-bis(diphenylphosphino)-2,2-dimethylpropane
1,1,1-tris(diphenylphosphinomethyl)methane
1,1,1-tris(diphenylphosphinomethyl)ethane
1,1,1-tris(diphenylphosphinomethyl)propane
1,1,1-tris(diphenylphosphinomethyl)butane
1,1,1-tris(diphenylphosphinomethyl)-1-phenylmethane
1,3-bis(diphenylphosphinomethyl)-2,2-diphenylphosphinopropane
1,3-bis(diphenylphosphinomethyl)-2,2-diethylphosphinopropane
1,3-bis(diphenylphosphino)-2-methylpropane Examples of sterically hindered amines (component c)) are:
bis(2,2,6,6-tetramethyl-4-piperidinyl)sebacate
bis(2,2,6,6-tetramethyl-4-piperidinyl)succinate
bis(1,2,2,6,6-pentamethyl-4-piperidinyl)sebacate
bis(1,2,2,6,6-pentamethyl-4-piperidinyl)succinate
bis(1-octyloxy-2,2,6,6-tetramethyl-4-piperidinyl)sebacate
bis(1-octyloxy-2,2,6,6-tetramethyl-4-piperidinyl)succinate
bis(1,2,2,6,6-pentamethyl-4-piperidinyl) n-butyl-3,5-di-tert-butyl-4-hydroxybenzylmalonate
bis(1,2,2,6,6-pentamethylpiperidyl)-2-n-butyl-2-(2-hydroxy-3,5-di-tert-butylbenzyl)malonate
tris(2,2,6,6-tetramethyl-4-piperidyl)nitrilotriacetate
tetrakis(2,2,6,6-tetramethyl-4-piperidyl) 1,2,3,4-butanetetracarboxylate
4-benzoyl-2,2,6,6-tetramethylpiperidine
4-stearyloxy-2,2,6,6-tetramethylpiperidine
a mixture of 4-hexadecyloxy-2,2,6,6-tetramethylpiperidine and 4-stearyloxy-2,2,6,6-tetramethylpiperidine
bis(2,2,6,6-tetramethyl-4-piperidinyl) 1,5-dioxaspiro[5.5]undecane-3,3-di-carboxylate
bis(1,2,2,6,6-pentamethyl-4-piperidinyl) 1,5-dioxaspiro[5.5]undecane-3,3-di-carboxylate
3-n-octyl-7,7,9,9-tetramethyl-1,3,8-triazaspiro[4.5]decane-2,4-dione
8-acetyl-3-dodecyl-7,7,9,9-tetramethyl-1,3,8-triazaspiro[4.5]decane-2,4-dione
3-dodecyl-1-(2,2,6,6-tetramethyl-4-piperidyl)pyrrolidine-2,5-dione
(also N-(2,2,6,6-tetramethyl-4-piperidyl)-n-dodecylsuccinimide)
3-dodecyl-1-(1,2,2,6,6-pentamethyl-4-piperidyl)pyrrolidine-2,5-dione
(also N-(1,2,2,6,6-pentamethyl-4-piperidyl)-n-dodecylsuccinimide)
3-dodecyl-1-(1-acetyl-2,2,6,6-tetramethyl-4-piperidyl)pyrrolidine-2,5-dione
(also N-(1-acetyl-2,2,6,6-tetramethyl-4-piperidyl)-n-dodecylsuccinimide)

1,1'-(1,2-ethanediyl)-bis(3,3,5,5-tetramethylpiperazinone)

the condensation product of 1-(2-hydroxyethyl)-2,2,6,6-tetramethyl-4-hydroxy-piperidine with succinic acid or dialkyl succinate the condensation product of N,N'-bis(2,2,6,6-tetramethyl-4-piperidinyl)-hexa-methylenediamine and 4-tert-octylamino-2,6-dichloro-1,3,5-triazine the condensation product of N,N'-bis(2,2,6,6-tetramethyl-4-piperidinyl)-hexa-methylenediamine and 4-cyclohexylamino-2,6-dichloro-1,3,5-triazine the condensation product of N,N'-bis(2,2,6,6-tetramethyl-4-piperidinyl)-hexa-methylenediamine and 4-morpholino-2,6-dichloro-1,3,5-triazine the condensation product of 2-chloro-4,6-bis(4-n-butylamino-2,2,6,6-tetra-methylpiperidyl)-1,3,5-triazine and 1,2-bis(3-aminopropylamino)ethane the condensation product of 2-chloro-4,6-bis(4-n-butylamino-1,2,2,6,6-penta-methylpiperidyl)-1,3,5-triazine and 1,2-bis-(3-aminopropylamino)ethane the condensation product of 2-chloro-4,6-bis(4-n-butylamino-1,2,2,6,6-penta-methylpiperidyl)-1,3,5-triazine and 1,6,11-trisaminoundecane the reaction product of 1,2-bis(3-aminopropylamino) ethane and 2,4,6-trichloro-1,3,5-triazine and 4-butylamino-2,2,6,6-tetramethylpiperidine the polymer of epichlorhydrin and 2,2,4,4-tetramethyl-7-oxa-3,20-diaza-20-(2,3-epoxi-propyl)-dispiro-[5.1.11.2]-heneicosane-21-one.

Particularly suitable are all mixtures which can be formed by combining one or more of the components a) to c).

If compared with the state of the art systems containing among other stabilizers sterically hindered phenol-based derivatives, the use of the new systems in polyolefin articles, particularly in polyolefin-fibers, avoids discoloration during processing and service life by both the formation of quinoid products and by action of $NO_x$ gases (gasfading).

Another advantage is the use of an overall lower concentration of stabilizers as compared with the conventional phenol-containing formulations (see example below).

The concentration of the stabilizer composition amounts from 0.001 to 5%, preferably from 0.01 to 1%, more preferably from 0.1 to 0.5% by weight, based on the weight of the polymers to be stabilized.

The polymer can contain other components such as aminoacid-based processing stabilizers, organic and inorganic UV absorbers, acid scavengers, metal desactivators, nucleating agents, fillers, antistatic agents, color improvers, plasticizers, lubricants, metal desactivators, dyes, pigments, emulsifiers, flame retardants, blowing agents, crosslinking agents, antiblocking agents, slip agents, thiosynergists inorganic carriers such as $SiO_2$ and processing aids.

Suitable thermoplastic polymers to be stabilized according to the instant invention are for example the following ones:

1. Polymers of monoolefins and diolefins, for example polypropylene, polyisobutylene, polybut-1-ene, poly-4-methylpent-1-ene, polyisoprene or polybutadiene, as well as polymers of cycloolefins, for example of cyclopentene or norbornene; furthermore polyethylene (which optionally can be crosslinked); for example, high density polyethylene (HDPE), polyethylene of high density and high molar mass (HDPE-HMW), polyethylene of high density and ultrahigh molar mass (HDPE-UHMW), medium density polyethylene (HMDPE), low density polyethylene (LDPE), linear low density polyethylene (LLDPE), branched low density polyethylene (BLDPE).

Polyolefins, i.e. polymers of mono-olefins exemplified in the preceding paragraph, in particular polyethylene and polypropylene, can be prepared by various, and especially by the following, methods:
   a) free-radical polymerization (normally under high pressure and at elevated temperature)
   b) catalytic polymerization using a catalyst that normally contains one or more metals of group IVb, Vb, VIb or VIII of the Periodic Table. These metals usually have one or more ligands, such as oxides, halides, alcoholates, esters, ethers, amines, alkyls, alkenyls and/or aryls that may be either π- or σ-coordinated. These metal, complexes may be in the free form or fixed on substrates, for example on activated magnesium chloride, titanium(III) chloride, alumina or silicon oxide. These catalysts may be soluble or insoluble in the polymerization medium. The catalysts can be active as such in the polymerization or further activators may be used, for example metal alkyls, metal hydrides, metal alkyl halides, metal alkyl oxides or metal alkyl-oxanes, the metals being elements of groups Ia, IIa and/or IIIa of the Periodic Table. The activators may be modified, for example, with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polyethylene with polyisobutylene, polypropylene with polyethylene (for example PP/HDPE/LDPE) and mixtures of different types of polyethylene (for example LDPE/HDPE) with one another.

3. Copolymers of monoolefins and diolefins with each other or with other vinyl monomers, for example ethylene-propylene copolymers, linear low density polyethylene (LLDPE) and mixtures thereof with low density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and their copolymers with carbon monoxide or ethylene-acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned under 1), for example polypropylene-ethylene-propylene copolymers, LDPE-ethylene-vinyl acetate copolymers, LDPE-ethylene-acrylic acid copolymers, LLDPE-ethylene-vinyl acetate copolymers, LLDPE-ethylene-acrylic acid copolymers and alternating or random polyalkylene-carbon monoxide copolymers and mixtures thereof with other polymers, for example polyamides.

4. Hydrocarbon resins (for example $C_5$–$C_9$) including hydrogenated modifications thereof (e.g. tackifier resins) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrilemethacrylate; mixtures of high impact strength of styrene copolymers and another polymer, for example a polyacrylate, a diene polymer or an ethylene-propylene-diene terpolymer; and block copolymers of styrene, such as styrene-butadiene-styrene, styrene-isoprene-styrene, styrene-ethylene/butylene-styrene or styrene-ethylene/propylene-styrene.

7. Graft copolymers of styrene or α-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof with the copolymers mentioned under 6), for example the copolymer mixtures known as ABS, MBS, ASA or AES polymers.

8. Halogen-containing polymers, such as polychloroprene, chlorinated rubber, chlorinated and brominated copolymer of isobutylene-isoprene (halobutyl ruuber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride; as well as copolymers thereof such as vinyl chloride-vinylidene chloride, vinyl chloride-vinyl acetate or vinylidene chloride-vinyl acetate.

9. Polymers derived from α,β-unsaturated acids and derivatives thereof, such as polyacrylates and polymethacrylates, polyacrylonitriles, polyacrylamides and polymethyl methacrylates impact-modified with butyl acrylate.

10. Copolymers of the monomers mentioned under 9) with each other or with other unsaturated monomers, for example acrylonitrile-butadiene copolymers, acrylo-nitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

11. Polymers derived from unsaturated alcohols and amines or the acyl-derivatives or acetals thereof, such as polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in section 1.

12. Homopolymers and copolymers of cyclic ethers, such as polyalkylene glycols, polyethylene oxide, polypropylene oxide or copolymers thereof with bisglycidyl ethers.

13. Polyacetals such as polyoxymethylene and those polyoxymethylenes which contain comonomers, for example ethylene oxide; polyacetals modified with thermoplastic polyurethanes, acrylates or MBS.

14. Polyphenylene oxides and sulfides, and mixtures thereof with styrene polymers or polyamides.

15. Polyurethanes derived from hydroxyl-terminated polyethers, polyesters and poly-butadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, such as polyamide 4, 6, 6/6, 6/10, 6/9, 6/12, 4/6, 12/12, 11 and 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalamide. Block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol. As well as polyamides or copolyamides modified with EPDM or ABS; and polyamides condensed during processing (RIM polyamide systems).

17. Polyureas, polyimides, polyamide-imides, polyether imides, polyester amides, polyhydantoins and polybenzimidazoles.

18. Polyesters derived from dicarboxylic acids and dialcohols and/or from hydroxy-carboxylic acids or the corresponding lactones, such as polyethylene terephthalate, polybutylene terephthalate, poly-1,4-dimethylolcyclohexane terephthalate, polyhydroxybenzoates, as well as block polyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, urea or melamine on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and un-saturated dicarboxylic acids with polyhydric alcohols and vinyl compounds as crosslinking agents, and also halogen-containing modifications thereof of low flammability.

24. Crosslinkable acrylic resins derived from substituted acrylates, for example from epoxy acrylates, urethane acrylates or polyester acrylates.

25. Alkyd resins, polyester resins and acrylic resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, examples being products of bisphenol A diglycidyl ethers, bisphenol F diglycidyl ethers, which are crosslinked by means of customary hardeners, such as anhydrides or amines, for example, with or without accelerators.

27. Natural polymers such as cellulose, natural rubber, gelatin and derivatives thereof which have been chemically modified in a polymer-homologous manner, for example cellulose acetates, cellulose propionates and cellulose butyrates, or the cellulose ethers such as methyl cellulose; as well as rosins and derivatives.

28. Mixtures (polyblends) of the aforementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/MBS, PPO/HIPS, PPO/PA 6.6 and copolymers, PA/HDPE, PA/PP, PA/PPO, PBT/ABS or PBT/PET/PC.

29. Natural and synthetic organic substances which constitute pure monomeric compounds or mixtures thereof, examples being mineral oils, animal or vegetable fats, oils and waxes, or oils, waxes and fats based on synthetic esters (e.g. phthalates, adipates, phosphates or trimellitates), and also blends of synthetic esters with mineral oils in any desired proportion by weight, as are employed, for example, as spin finishes, and aqueous emulsions thereof.

30. Aqueous emulsions of natural or synthetic rubbers, such as natural rubber latex or latices of carboxylated styrene-butadiene copolymers.

The stabilizer compositions of the instant invention or the thermoplastic polymers to be stabilized may if desired also comprise further additives, examples being antioxidants, light stabilizers, metal deactivators, antistatic agents, flame retardants, lubricants, nucleating agents, acid scavengers (basic costabilizers), pigments and fillers. Examples of suitable additives which can additionally be employed in combination are compounds, as set out below:

1. Antioxidants 1.1 Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or sidechain-branched nonylphenols, such as 2,6-dinonyl-4-methylphenol, 2,4-dimethyl-6-(1-methylundec-1'-yl)-phenol, 2,4-dimethyl-6-(1'-methylheptadec-1'-yl)-phenol, 2,4-dimethyl-6-(1'-methyltridec-1'-yl)phenol and mixtures thereof.

1.2 Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3 Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4 Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis-(2,6-dimethyl-4-hydroxyphenyl)disulfide.

1.5 Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclo-hexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidene-bis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, bis(3-tert-butyl-4-hydroxy-5-methylphenyl)-dicyclopentadiene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)-pentane, ethylene glycol bis[3,3-bis(3'-tert-butyl-4'-hydroxyphenyl)butyrate].

1.6 O—, N— and S-benzyl compounds, for example 3,5,3',5'-tetra-tert-butyl-4,4'-dihydroxydibenzyl ether, octadecyl 4-hydroxy-3,5-dimethylbenzylmercaptoacetate, tris (3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl 3,5-di-tert-butyl-4-hydroxybenzylmercaptoacetate, tridecyl 4-hydroxy-3,5-di-tert-butylbenzylmercaptoacetate.

1.7 Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecyl-mercaptoethyl-2,2-bis(3,5-di-tert-butyl-4-hydroxybenzyl)malonate, di-[4-(1,1,3,3-tetramethylbutyl)phenyl] 2,2-bis(3,5-di-tert-butyl-4-hydroxybenzyl)malonate.

1.8 Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)-phenol.

1.9 Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurat, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

1.10 Benzylphosphonates, for example dimethyl 2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the Ca-salt of the monoethyl ester of 3,5-di-tert-butyl-4-hydroxybenzylphosphonic acid.

1.11 Acylaminophenols, for example 4-hydroxylauranilide, 4-hydroxystearanilide, octyl N-(3,5-di-tert-butyl-4-hydroxyphenyl)carbamate.

1.12 Esters of β-(3,5-di-tert-butyl-4-hydroxyphenyl)propionic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxalamide, 3-thia-undecanol, 3-thia-pentadecanol, trimethylhexanediol, trimethylolpropane, 4-hydroxymethyl-1-phospha-2,6,7-trioxabicyclo[2.2.2]octane.

1.13 Esters of β-(5-tert-butyl-4-hydroxy-3-methylphenyl) propionic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thia-undecanol, 3-thiapentadecanol, trimethylhexanediol, trimethylolpropane, 4-hydroxymethyl-1-phospha-2,6,7-trioxabicyclo[2.2.2]octane.

1.14 Esters of β-(3,5-dicyclohexyl-4-hydroxyphenyl)propionic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxalamide, 3-thia-undecanol, 3-thia-pentadecanol, trimethylhexanediol, trimethylolpropane, 4-hydroxymethyl-1-phospha-2,6,7-trioxabicyclo[2.2.2]octane.

1.15 Esters of 3,5-di-tert-butyl-4-hydroxyphenylacetic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl)isocyanurate, N,N'-bis-(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16 Esters of 3,3-bis(3'tert-butyl-4'-hydroxyphenyl)butyric acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxalamide, 3-thia-un-decanol, 3-thiapentadecanol, trimethylhexanediol, trimethylolpropane, 4-hydroxymethyl-1-phospha-2,6,7-trioxabicyclo[2.2.2]octane.

1.17 Amides of β-(3,5-di-tert-butyl-4-hydroxyphenyl)propionic acid, e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

1.18 Tocopherol, such as α-tocopherol, β-tocopherol, γ-tocopherol, δ-tocopherol and mixtures thereof (vitamin E).

1.19 Ascorbic acid (vitamin C).

1.20 Amine antioxidants, for example N,N'-diisopropyl-p-phenylenediamine, N,N'di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di(naphthyl-2-)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(-toluenesulfonamido)diphenylamine, N,N'-di-methyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, di(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-di-[(2-methylphenyl)amino]ethane, 1,2-di-(phenylamino)propane, (o-tolyl)biguanide, di[4-(1',3'-dimethylbutyl)-phenyl]-amine, tert-octylated N-phenyl-1-naphthylamine, mixture of mono- and dialkylated tert-butyl/tert-octyldiphenylamines, mixture of mono- and dialkylated nonyldiphenylamines, mixture of mono- and dialkylated dodecyldiphenylamines, mixture of mono- and dialkylated isopropyl/isohexyl-diphenylamines, mixture of mono- and dialkylated tert-butyldiphenylamines, 2,3-dihydro-3,3-dimethyl-4H-1,4-benzothiazine, phenothiazine, mixture of mono- and dialkylated tert-butyl/tert-octylphenothiazines, mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperidine-4-yl)hexamethylenediamine, bis(2,2,6,6-tetramethylpiperidine-4-yl)sebacate, 2,2,6,6-tetramethylpiperidin-4-one, 2,2,6,6-tetramethylpiperidine-4-ol.

2. UV Absorbers and Light Stabilizers 2.1 2-(2'-Hydroxyphenyl)benzotriazoles, for example 2-(2'-hydroxy-5'-methylphenyl)benzogtriazole, 2-(3',5'-di-tert-butyl-2'-hydroxyphenyl)benzotriazole, 2-(5'-tert-butyl-2'-hydroxyphenyl)benzotriazole, 2-[2'-hydroxy-5'-(1,1,3,3-tetramethylbutyl)-phenyl]benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotrazole, 2,2'-methylenebis[4-(1,1,3,3-tetramethylbutyl)-6-benzotriazol-2-ylphenol]; the trans-esterification product of 2-[3'-tert.-butyl-5'-(2-methoxycarbonylethyl)-2'-hydrqxyphenyl]benzotriazole with polyethylene glycol 300; [R—CH$_2$CH$_2$—COO—(CH$_2$)$_3$]$_2$ where R=3'-tert-butyl-4'-hydroxy-5'-2H-benzotriazol-2-yl-phenyl.

2.2 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-di-methoxy derivative.

2.3 Esters of substituted or unsubstituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4 Acrylates, for example ethyl α-cyano-β,β-diphenylacrylate or isooctyl α-cyano-β,β-diphenylacrylate, methyl α-carbomethoxycinnamate, methyl α-cyano-β-methyl-p-methoxycinnamate or butyl α-cyano-β-methyl-p-methoxycinnamate, methyl α-carbomethoxy-p-methoxycinnamate and N-(β-carbomethoxy-β-cyano-vinyl)-2-methylindoline.

2.5 Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of monoalkyl esters, such as of the methyl or ethyl ester, of 4-hydroxy-3,5-di-tert-butylbenzylphosphonic acid, nickel complexes of ketoximes, e.g. of 2-hydroxy-4-methylphenyl undecyl ketoxime, nickel complexes of 1-phenyl-4-lauroyl-5-hydroxypyrazole, with or without additional ligands.

2.6 Sterically hindered amines, for example bis(2,2,6,6-tetramethylpiperidine-4-yl)sebacate, bis(2,2,6,6-tetramethylpiperidine-4-yl)glutarate, bis(2,2,6,6-tetramethylpiperidine-4-yl)succinate, bis(1,2,2,6,6-pentamethylpiperidine-4-yl)sebacate, bis(1,2,2,6,6-pentamethylpiperidine-4-yl)glutarate, 2,2,6,6-tetramethylpiperidyl behenate, 1,2,2,6,6-pentamethylpiperidyl-behenate, the condensate of 1-hydroxyethyl-2,2,6,6-tetramethyl-4-hydroxypiperidine and succinic acid, the condensate of N,N'-bis-(2,2,6,6-tetramethyl-4-piperidyl)-hexamethylendiamine and 4-tert-octylamino-2,6-dichloro-1,3,5-s-triazine, tris-(2,2,6,6-tetramethyl-4-piperidyl)nitrilo-triacetate, tetrakis(2,2,6,6-tetramethyl-4-piperidyl) 1,2,3,4-butantetraoate, 1,1'-(1,2-ethanediyl)-bis-(3,3,5,5-tetramethylpiperazinone), 4-benzoyl-2,2,6,6-tetramethylpiperidine, 4-stearyloxy-2,2,6,6-tetramethylpiperidine, 4-stearoyloxy-2,2,6,6-tetramethylpiperidine, 4-stearyloxy-1,2,2,6,6-pentamethylpiperidine, 4-stearoyloxy-1,2,2,6,6-pentamethylpiperidine, bis(1,2,2,6,6-pentamethylpiperidyl) 2-n-butyl-2-(2-hydroxy-3,5-di-tert-butylbenzyl)malonate, bis(1,2,2,6,6-pentamethylpiperidyl) 2-n-butyl-2-(4-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpipenidyl)sebacate, bis-(1-octyloxy-2,2,6,6-tetramethylpiperidyl)succinate, the condensate of N,N'-bis(2,2,6,6-tetramethyl-4-piperidyl)hexamethylenediamine and 4-morpholino-2,6-dichloro-1,3,5-triazine, the condensate of N,N'-bis(2,2,6,6-tetramethyl-4-piperidyl)hexamethylenediamine and 4-cyclohexylamino-2,6-dichloro-1,3,5-triazine, the condensate of 2-chloro-4,6-di-(4-n-butylamino-2,2,6,6-tetramethylpiperidyl)-1,3,5-triazine and 1,2-bis-(3-aminopropylamino)ethane, the condensate of 2-chloro-4,6-di-(4-methoxypropylamino-2,2,6,6-tetramethylpiperidyl)-1,3,5-triazine and 1,2-bis-(3-aminopropylamino)ethane, the condensate of 2-chloro-4,6-di-(4-methoxypropylamino-1,2,2,6,6-pentamethylpiperidyl)-1,3,5-triazine and 1,2-bis-(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)-ethane, reaction products of 2-chloro-4,6-di-(4-n-butylamino-2,2,6,6-tetramethylpiperidyl)-1,3,5-triazine with mono- or polyfunctional amines, where between one and all the active hydrogen atoms on the amine are replaced, such as with ethylenediamine, diethylenetriamine, hexamethylenediamine, 1,2-bis-(3-aminopropylamino)ethane, reaction products of 2-chloro-4,6-di-(4-n-butyl-amino-1,2,2,6,6-pentamethylpiperidyl)-1,3,5-triazine with mono- or polyfunctional amines, where between one and all the active hydrogen atoms on the amine are replaced, such as with ethylenediamine, diethylenetriamine, triethylenetetramine, hexamethylenediamine, 1,2-bis(3-aminopropylamino)ethane, reaction products of 2-chloro-4,6-di-(4-n-butylamino-2,2,6,6-tetramethylpiperidyl)-1,3,5-triazine and 4-tert-octylamino-2,6-dichloro-1,3,5-s-triazine with mono- or polyfunctional amines, where between one and all the active hydrogen atoms on the amine are replaced, such as with ethylenediamine, diethylenetriamine, triethylenetetramine, haxamethylenediamine, 1,2-bis(3-aminopropylamino)ethane, reaction products of 2-chloro-4,6-di-(4-n-butylamino-1,2,2,6,6-pentamethylpiperidyl)-1,3,5-triazine and 4-tert-octylamino-2,6-dichloro-1,3,5-s-triazine with mono- or polyfunctional amines, where between one and all the active hydrogen atoms on the amine are replaced, such as with ethylenediamine, diethylenetriamine, triethylenetetramine, hexa nethylenediamine, 1,2-bis-(3-aminopropyl-amino)ethane, reaction products of 2-chloro-4,6-di-(4-n-butylamino-2,2,6,6-tetramethylpiperidyl)-1,3,5-triazine and 4-(4-n-butylamino-2,2,6,6-tetramethylpiperidyl)-2,6-dichloro-1,3,5-s-triazine with mono- or polyfunctional amines, where between one and all the active hydrogen atoms on the amine are replaced, such as with ethylenediamine, diethylenetriamine, triethylenetetramine, hexamethylenediamine, 1,2-bis-(3-aminopropyl-amino)ethane, reaction products of 2-chloro-4,6-di-(4-n-butylamino-1,2,2,6,6-pentamethylpiperidyl)-1,3,5-triazine and 4-(4-n-butylamino-2,2,6,6-tetramethylpiperidyl)-2,6-dichloro-1,3,5-s-triazine with mono- or polyfunctional amines, where between one and all the active hydrogen atoms on the amine are replaced, such as with ethylenediamine, diethylenetriamine, triethylenetetramine, hexamethylenediamine, 1,2-bis-(3-aminopropylamino)ethane, the condensate of 1,2-bis(3-aminopropylamino)ethane and 2,4,6-trichloro-1,3,5-triazine and also 4-butylamino-2,2,6,6-tetramethylpiperidine, N-(2,2,6,6-tetramethyl-4-piperidyl)-n-dodecylsuccinimide, N-(1,2,2,6,6-pentamethyl-4-piperidyl)-n-dodecylsuccinimide, 8-acetyl-3-dodecyl-7,7,9,9-tetramethyl-1,3,8-triazaspiro[4.5]decane-2,4-dione, oligomerized 2,2,4,4-tetramethyl-20-(oxiranylmethyl)-7-oxa-3,20-diaza-dispiro[5.1.11.2]heneicosan-21-one, oligomerized 1,2,2,4,4-pentamethyl-20-(oxiranylmethyl)-7-oxa-3,20-diazadispiro[5.1.11.2]heneicosan-21-one, oligomerized 1-acetyl-2,2,4,4-tetramethyl-20-(oxiranylmethyl)-7-oxa-3,20-diaza-dispiro-[5.1.11.2]heneicosan-21-one, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, 2,2,4,4-tetramethyl-7-oxa-3,20-diazadispiro-[5.1.11.2]heneicosan-21-one, 2,2,4,4-tetramethyl-7-oxa-21-oxo-3,20-diazadispiro-[5.1.11.2] heneicosane-3-propanoic acid dodecyl ester, 2,2,4,4-tetramethyl-7-oxa-21-oxo-3,20-diaza-dispiro-[5.1.11.2] heneicosane-3-propanoic acid tetradecyl ester, 2,2,3,4,4-penta-methyl-7-oxa-3,20-diazadispiro-[5.1.11.2] heneicosan-21-one, 2,2,3,4,4-pentamethyl-7-oxa-21-oxo-3,20-diaza-dispiro-[5.1.11.2]heneicosane-3-propanoic acid dodecyl ester, 2,2,3,4,4-pentamethyl-7-oxa-21-oxo-3,20-diazadispiro-[5.1.11.2]-henelicosane-3-propanoic acid tetradecyl ester, 3-acetyl-2,2,4,4-tetramethyl-7-oxa-3,20-diazadispiro-[5.1.11.2]heneicosane-21-one, 3-acetyl-2,2,4,4-tetramethyl-7-oxa-21-oxo-3,20-diaza-dispiro-[5.1.11.2]heneicosane-3-propanoic acid dodecyl ester, 3-acetyl-2,2,4,4-tetramethyl-7-oxa-21-oxo-3,20-diazadispiro-[5.1.11.2]heneicosane-3-propanoic acid tetradecyl ester, 1,1',3,3',5,5'-hexahydro-2,2',4,4',6,6'-hexaaza-2,2',6,6'-bismethano-7,8-dioxo-4,4'-bis(1,2,2,6,6-pentamethyl-4-piperidyl)biphenyl, poly-N,N'-bis-(2,2, 6,6-tetramethyl-4-piperidyl)-1,8-diazadecylene, adduct of 2,2,6,6-tetramethyl-4-allyloxypiperidine and polymethylhydridosiloxane (molar mass up to 4000), adduct of 1,2,2,6,6-pentamethyl-4-allyloxypiperidine and polymethylhydridosiloxane (molar mass up to 4000), N,N'-diformyl-N,N'-bis(2,2,6,6-tetramethyl-4-piperidinyl)-hexamethylenediamine, N,N'-diformyl-N,N'-bis(1,2,2,6,6-pentamethyl-4-piperidinyl)hexamethylenediamine, 5,11-bis-(2,2,6,6-tetramethyl-4-piperidinyl)-3,5,7,9,11,13-hexaazatetra-cyclo-[7.4.0.0$^{2,7}$.1$^{3,13}$]tetradecane-8,14-dione, 5,11-bis(1,2,2,6,6-pentamethyl-4-piperidinyl)-3,5,7,9,11,13-hexaazatetra-cyclo[7.4.0.0$^{2,7}$.1$^{3,13}$]tetradecane-8,14-dione, [(4-methoxyphenyl)methylene]-propanedioic acid bis(2,2,6,6-tetramethyl-4-piperidinyl) ester, [(4-methoxyphenyl)-methylene]propanedioic acid bis-(1,2,2,6,6-pentamethyl-4-piperidinyl) ester, 2,4,6-tris(N-cyclohexyl-N-[2-(3,3,4,5,5-pentamethylpiperazinon-1-yl) ethyl]amino)-1,3,5-triazine, copolymer of styrene with methylstyrene and maleic anhydride reacted with 4-amino-2,2,6,6-tetramethyl-piperidine and octadecylamine, copolymer of styrene with α-methylstyrene and maleic anhydride reacted with 4-amino-1,2,2,6,6-pentamethylpiperidine and octadecylamine, polycarbonate with 2,2'-[(2,2,6,6-tetramethyl-4-piperidinyl)imino)-bis[ethanol] as diol component, polycarbonate comprising 2,2'-(1,2,2,6,6-pentamethyl-4-piperidinyl)imino]bis[ethanol] as diol component, copolymer of maleic anhydride and an α-olefin up to C$_{30}$ reacted with 4-amino-2,2,6,6-tetramethyl-piperidine, copolymer of maleic anhydride and an α-olefin up to C$_{30}$ reacted with 1-acetyl-4-amino-2,2,6,6-tetramethylpiperidine, copolymer of maleic anhydride and an α-olefin up to C$_{30}$ reacted with 4-amino-1,2,2,6,6-pentamethylpiperidine, and also the N-alkyl- and N-aryl-oxy derivatives of the abovementioned compounds with free NH groups on the piperidine, especially α-methylbenzyloxy and alkyloxy from C$_1$ to C$_{18}$.

2.7 Oxalamides, for example 4,4'-dioctyloxyoxanilide, 2,2'-diethoxyanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of o- and p-methoxy-disubstituted and of o- and p-ethoxy-disubstituted oxanilides.

2.8 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4',6-bis(2',4-dimethylphenyl)-1,3,5-triazine, 2-(2,4-dihydroxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxypropyloxy)phenyl]4,6-bis(2,4-dimethylphenyl)-1,3,5-triazine, 2-[2-hydroxy-4-(2-hydroxy-3-octyloxypropyloxy)phenyl]4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[4-dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine.

3. Metal deactivators, for example, N,N'-diphenyloxalamnide, N-salicylal-N'-salicyclohydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenyl-hydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, bisisodecyloxy pentaerythritol diphosphite, bis(2,4-di-tert-butyl-6-methylphenyl) pentaerythritol diphosphite, bis(2,4,6-tri-tert-butyl-phenyl) pentaerythritol diphosphite, tristearyl sorbitol triphosphite, tetrakis(2,4-di-tert-blutylphenyl) 4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyl-dibenzo[d,g]-1,3,2-dioxaphosphocin, bis(2,41-di-tert-butyl-6-methylphenyl) methyl phosphite, bis(2,4-di-tert-butyl-6-methylphenyl) ethyl phosphite, tris(2-tert-butyl-4-thio(2'-methyl-4'-hydroxy-5'-tert-butyl)phenyl-5-methyl) phenyl phosphite, 2,2',2''-nitrilo[triethyl tris(3,3',5,5'-tetra-tert-butyl-1,1'-biphenyl-2,2'-diyl)phosphite], bis[2-methyl-4,6-bis(1,1-dimethylethyl)phenol]phosphorous acid ethyl ester.

5. Hydroxylamines, examples being N,N-dibenzylhydroxylamine, N,N-diethyl-hydroxylamine, N,N-dioctylhydroxylamine, N,N-dilaurylhydroxylamine, N,N-di-tetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamines prepared from hydrogenated tallow fatty amine.

6. Nitrones, examples being N-benzyl alpha-phenyl nitrone, N-ethyl alpha-methyl nitrone, N-octyl alpha-heptyl nitrone, N-lauryl alpha-undecyl nitrone, N-tetradecyl alpha-tridecyl nitrone, N-hexadecyl alpha-pentadecyl nitrone, N-octadecyl alpha-heptadecyl nitrone, N-hexadecyl alpha-heptadecyl nitrone, N-octadecyl alpha-pentadecyl nitrone, N-heptadecyl alpha-heptadecyl nitrone, N-octadecyl alpha-hexadecyl nitrone, nitrones derived from N,N-dialkylhydroxylamines prepared from hydrogenated tallow fatty amines.

7. Zeolites and hydrotalcites, such as ®DHT 4A. Hydrotalcites of this kind can be described by the formula $$[(M^{2+})_{1-x}(M^{3+})_x(OH)_2(A^{n-})_{x/n}yH_2O],$$

where
($M^{2+}$) is Mg, Ca, Sr, Ba, Zn, Pb, Sn, Ni
($M^{3+}$) is Al, B, Bi
$A^n$ is an anion of valency n
n is an integer from 1–4
x is a value between 0 and 0.5
y is a value between 0 and 2
A is $OH^-$, $Cl^-$, $Br^-$, $I^-$, $ClO_4^-$, $CH_3COO^-$, $C_6H_5COO^-$, $CO_3^{2-}$, $SO_4^{2-}$, $(OOC-COO)^{2-}$, $(CHOHCOO)_2^{2-}$, $(CHOH)_4CH_2OHCOO^-$, $C_2H_4(COO)_2^{2-}$, $(CH_2$ $COO)_2^{2-}$, $CH_3CHOHCOO^-$, $SiO_3^{2-}$, $SiO_4^{4-}$, $Fe(CN)_6^{3-}$, $Fe(CN)_6^{4-}$, $BO_3^{3-}$, $PO_3^{3-}$, $HPO_4^{2-}$.

Preference is given to employing hydrotalcites in which ($M^{2+}$) is ($Ca^{2+}$), ($Mg^{2+}$) or a mixture of ($Mg^{2+}$) and ($Zn^{2+}$); ($A^{n-}$) is $CO_3^{2-}$, $BO_3^{3-}$, $PO_3^{3-}$; x has a value from 0 to 0.5 and y has a value from 0 to 2. It is also possible to employ hydrotalcites that can be described with the formula $$[(M^{2+})_x(Al^{3+})_2(OH)_{2x+6nz}(A^{n-})_{2}yH_2O].$$

Here ($M^{2+}$) is $Mg^{2+}$, $Zn^{2+}$, but more preferably $Mg^{2+}$. ($A^{n-}$) is an anion, in particular from the group consisting of $CO_3^{2-}$, $(OOC-COO)^{2-}$, $OH^-$ and $S^{2-}$, where n describes the valency of the ion. y is a positive number, more preferably between 0 and 5, especially between 0.5 and 5. x and z have positive values, which in the case of x are preferably between 2 and 6 and in the case of z should be less than 2. The hydrotalcites of the following formulae are to be regarded with particular preference:

$$Al_2O_3 \times 6MgO \times CO_2 \times 12H_2O,$$

$$Mg_{4.5}Al_2(OH)_{13} \times CO_3 \times 3.5H_2O,$$

$$4MgO \times Al_2O_3 \times CO_2 \times 9H_2O,$$

$$4MgO \times Al_2O_3 \times CO_2 \times 6H_2O,$$

$$ZnO \times 3MgO \times Al_2O_3 \times CO_2 \times 8-9H_2O,$$

$$ZnO \times 3MgO \times Al_2O_3 \times CO_2 \times 5-6H_2O,$$

$$Mg_{4.5}Al_2(OH)_{13} \times CO_3.$$

Hydrotalcites are employed in the polymer preferably in a concentration of from 0.01 to 5% by weight, in particular from 0.2 to 3% by weight, based on the overall polymer formulation.

8. Thiosynergists, examples being dilauryl thiodipropionate and distearyl thiodipropionate.
9. Peroxide scavengers, examples being esters of β-thiodipropionic acid, for example the lauryl, stearyl, myristyl or tridecyl ester, mecaptobenzimidazole, the zinc salt of 2-mercaptobenzimidazole, zinc alkyldithiocarbamates, zinc dibutyldithiocarbamate, dioctadecyl monosulfide, dioctadecyl disulfide, pentaerythritol tetrakis(β-dodecylmercapto)propionate.
10. Polyamide stabilizers, examples being copper salts in combination with iodides and/or phosphorus compounds and salts of divalent manganese.
11. Basic costabilizers, examples being melamine, polyvinylpyrrolidone, dicyandiamide, triallyl cyanurate, urea derivatives, hydrazine derivatives, amines, polyamines, polyurethanes, alkali metal and alkaline earth metal salts of higher fatty acids, for example Ca stearate, Zn stearate, Mg behenate, Mg stearate, Na ricinoleate, K palmitate, antimony pyrocatecholate or tin pyrocatecholate, alkali metal and alkaline earth metal salts and also the zinc salt or the aluminum salt of lactic acid.
12. Nucleating agents, such as inorganic substances, examples being talc, metal oxides, such as titanium oxide or magnesium oxide, phosphates, carbonates or sulfates of, preferably, alkaline earth metals, organic compounds, such as mono- or polycarboxylic acids and also their salts, examples being 4-tert-butylbenzoic acid, ladipic acid; diphenylacetic acid; sodium succinate or sodium benzoate; acetals of aromatic aldehydes and polyfunctional alcohols such as sorbitol, for example, such as 1,3-2,4-di(benzylidene)-D-sorbitol, 1,3-2,4-di(4-tolylidene)-D-sorbitol, 1,3-2,4-di(4-ethylbenzylidene)-D-sorbitol, polymeric compounds, such as ionic copolymers (ionomers), for example.
13. Fillers and reinforcing agents, examples being calcium carbonate, silicates, glass fibers, asbestos, talc, kaolin, mica, barium sulfate, metal oxides and metal hydroxides, carbon black, graphite, wood flour and other flours or fibers of other natural products, synthetic fibers.
14. Other additives, examples being plasticizers, lubricants, emulsifiers, pigments, rheological additives, catalysts, leveling assistants, optical brighteners, flame-proofing agents, antistatics, blowing agents, color improvers.
15. Benzofuranones and indolines, as described for example in U.S. Pat. No. 4,325,863, U.S. Pat. No. 4,338,244, U.S. Pat. No. 5,175,312; U.S. Pat. No. 5,216,052; U.S. Pat. No. 5,252,643, DE-A4316611, DE-A-4316622, DE-A-4316876, EP-A-0589839 or EP-A-0591102, or 3-[4-(2-acetoxy-ethoxy)phenyl]-5,7-di-tert-butylbenzofuran-2-one, 5,7-di-tert-butyl-3-[4-(2-stearoyloxyethoxy)phenyl]-benzofuranon-2-one, 3,3'-bis[5,7-di-tert-butyl-3-(4-[2-hydroxyethoxy]phenyl)-benzofuran-2-one, 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-diethyl-4-pivaloyloxyphenyl)-5,7-di-tert-butylbenzofuran-2-one.

The invention relates also to those of the mentioned additives, which are used in form of nano-sized particles.

The following examples shall demonstrate the invention.

EXAMPLES

The following compounds have been used:

compound (a): Sandostab P-EPQ® (Clariant)
tetrakis(2,4-di-tert.-butylphenyl)-4,4'-biphenylendiphosphit

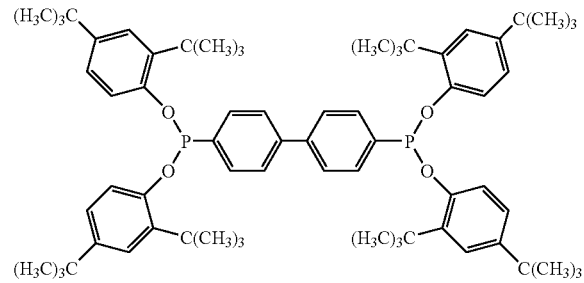

compound (b): 5,7-di-tert-butyl-3-phenyl-3H-benzofuran-2-one compound (c): Hostavin N30® (Clariant)
polymer of epichlorhydrin and 2,2,4,4-tetramethyl-7-oxa-3,20-diaza-20-(2,3-epoxi-propyl)-dispiro-[5.1.11.2]-heneicosane-21-one compound (d): Hostanox O 10® (Clariant)
tetrakis[methylen-3-(3',5')-di-tert.-butyl-4'-hydroxyphenyl)propionate]methane

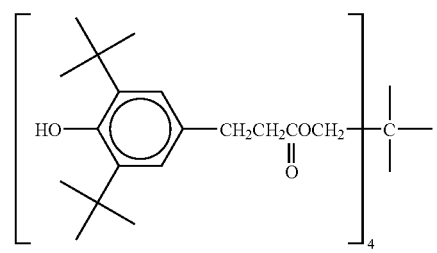

Tinuvin 622® (Ciba SC):
poly-(N-hydroxyethyl-2,2,6,6-tetramethyl-4-hydroxy-piperidyl-succinate)

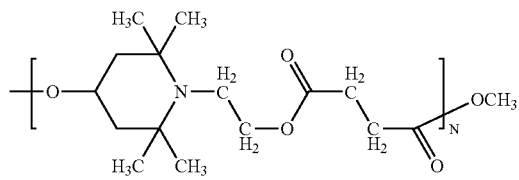

In the following description "parts" mean "parts by weight".

Polypropylene $3^{rd}$ generation (type Moplen FL F20; producer Montell; melt flow (230° C./2.16 kg):14.2 g/10 min.) has been processed by multiple pass extrusion at T=280° C. after adding to 100 parts of the polymer 0.025 parts triphenylphosphine, 0.025 parts compound (b), 0.020% compound (c) and 0.10 parts Ca-stearate.

The polymer powder and the additives have been mixed and homogenized in a laboratory mixer type Kenwood before pre-extrusion was carried out using a single screw extruder type KPS-25 (producer Haendle; screw diameter 4mm) at 210° C./80 rpm. The main extrusions took place using a single screw extruder type Göttfert Extrusimeter at T=280° C. (screw-compression 1:3, 50 rpm, die-diameter 2 mm) coupled with an online-rheometer. The individual melt flow indices have been determined according to ASTM 1238 at 230° C./2.16 kg). Color has been measured according to DIN 6167 using a Minolta spectrocolorimeter. The corresponding results are listed in the following tables 1A and 1B and compared against a formulation which contains 0.10 parts compound (d) (tetrafunctional, commercial phenol), 0.05 parts compound (a) and 0.10 parts Ca-stearate.

TABLE 1A

MFI-results

| stabilizer formulation (acid scavenger: 0.10% Ca-stearate) | $1^{st}$ pass | $3^{rd}$ pass | $5^{th}$ pass |
|---|---|---|---|
| comparative: | | | |
| 0.05 parts compound (a) + 0.10 parts compound (d) | 13.22 | 16.85 | 22.27 |
| 0.025 parts triphenylphosphine + 0.025 parts compound (b) + 0.02 parts compound (c) | 12.81 | 15.48 | 18.20 |

TABLE 1B

Color (YI)

| stabilizer formulation (acid scavenger: 0.10% Ca-stearate) | $1^{st}$ pass | $3^{rd}$ pass | $5^{th}$ pass |
|---|---|---|---|
| comparative: | | | |
| 0.05 parts compound (a) + 0.10 parts compound (d) | 1.49 | 2.77 | 4.78 |
| 0.025 parts triphenylphosphine + 0.025 parts compound (b) + 0.02 parts compound (c) | 0.27 | 0.51 | 1.34 |

Processing, Exposure and Testing of Polypropylene 100 parts by weight of polypropylene (PP), type Moplen FLF20 (producer: Himont; internal code PP 97-4) [MFI: 12 g/10 min/230° C./2.16 kg] has been mixed in a laboratory mixer from Kenwood adding 0.10 parts by weight of Hostanox O 10® (phenol), 0.10 parts by weight of Ca-stearate, 0.05 parts by weight of Sandostab P-EPQ®. After processing this sample has been taken as reference. Alternatively used formulations based on 0.02 parts by weight of a sterically hindered amine (HA(L)S), 0.10 parts by weight of Ca-stearate, 0.04 parts by weight of 5,7-di-tert.-butyl-(3-phenyl)-3H-benzofuran-2-one (lactone) and 0.01 parts by weight of triphenylphosphine. Afterwards pre-extrusion was carried out using a single screw extruder type Haendle KPS 25 (screw compression 1:3, die diameter 4 mm, screw speed 80 rpm) at 220° C. The main extrusions ($1^{st}$–$5^{th}$) took place using a single screw extruder type Göttfert Extrusimeter (screw-compression 1:3, 100 rpm, die-diameter 2 mm) with 1 heating zone at 180° C., 2 heating zones at 200° C. and 4 heating zones each at T=210° C. This process step was finalized by granulation (0.5–2.00 mm). Granules of the $1^{st}$ and $5^{th}$ extrusion pass have been lateron transferred into the frame (thickness 0.5 mm) placed on a laboratory heat press type Fontjne TP 600. The plate temperature of 210° C. was chosen applying first during a period of 90 seconds a pressure of 50 kN, afterwards for another 90 seconds a pressure of 500 kN.

The so prepared plates have been used for artificial long-term exposure (CAM-7) using a Xe-Arc-type Weatherometer according to the procedure described under ASTM G 26-90. As an important feature the development of the carbonyl-absorption as measured by means of an IR-spectrometer type FTS 155 has been chosen which describes the relative extent of degradation by oxidation. This method is primarily intended for polypropylene. Actual measurements concentrate on the residence time (in hours) to develop a carbonyl-absorption $\Delta$ (>C=O)=1. Measured were samples after the first and the fifth extrusion pass. The results are presented in Table 2. Supplementary to the given time value to reach an additional carbonyl-absorption $\Delta$ (>C=O)=1 a prolongation factor PF is shown which reflects the efficiency of the individual stabilzer system as well.

As longer the measured time period and as larger this prolongation factor as better efficiency is provided by the stabilizer system.

According to data given in Table 2 it clearly can be demonstrated that the formulation consisting of 0.01% triphenylphosphine, 0,04% 5,7-di-tert.-butyl-(3-phenyl)-3H-benzofuran-2-one (in Table 2 referred to as "lactone") and 0.02% Hostavin N 300 outperforms the other formulation and is particularly superior to the (traditional) phenol-containing formulation (reference).

TABLE 2

| extrusion pass no. | stabilizer formulation | delta (>C=O) = 1/hrs. | prolongation factor |
|---|---|---|---|
| 1 | 0.05% Sandostab P-EPQ®, 0.10% Hostanox O 10® (Reference) | 317 | 1 |
| 5 | 0.05% Sandostab P-EPQ®, 0.10% Hostanox O 10® (Reference) | 293 | 1 |
| 1 | 0.01% triphenylphosphine, 0.04% lactone, 0.02% Tinuvin 622® | 911 | 2.874 |
| 5 | 0.01% triphenylphosphine, 0.04% lactone, 0.02% Tinuvin 622® | 868 | 2.962 |

TABLE 2-continued

| extrusion pass no. | stabilizer formulation | delta (>C=O) = 1/hrs. | prolongation factor |
|---|---|---|---|
| 1 | 0.01% triphenylphosphine, 0.04% lactone, 0.02% Hostavin N 30 ® | 1098 | 3.464 |
| 5 | 0.01% triphenylphosphine, 0.04% lactone, 0.02% Hostavin N 30 ® | 1149 | 3.921 |

The invention claimed is:

1. A stabilizer composition for thermoplastic polymers comprising a) a compound of the formula (II),

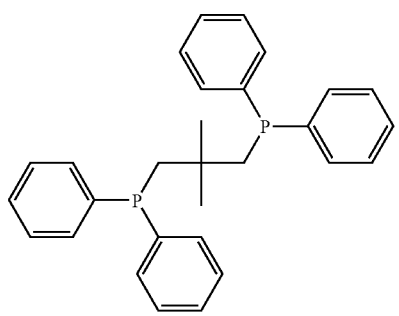

(II)

b) at least one 2-phenylbenzofuranone, and
c) at least one sterically hindered piperidine based stabilizer (HAS), wherein the weight ratio of component a) to component b) to component c) is from 1:0.05:0.5 to 1:3:5.

2. A stabilizer composition as claimed in claim 1, wherein
b) the at least one 2-phenylbenzofuranone is at least one compound of the formula V

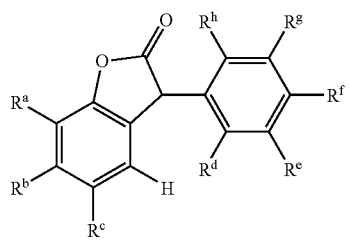

V in which $R^a$, $R^b$, $R^d$, $R^e$, $R^f$, $R^g$, and $R^h$ independently of one another are hydrogen; hydroxyl; $C_1$–$C_{18}$-alkyl; or phenyl which is unsubstituted or mono-, di- or trisubstituted by $C_1$–$C_4$-alkyl; $C_7$–$C_9$-phenylalkyl, $C_1$–$C_{18}$-alkoxy or $C_5$–$C_{12}$-cycloalkyl unsubstituted or mono-, di- or trisubstituted by $C_1$–$C_4$-alkyl; and $R^c$ has one of the meanings given above for $R^a$, $R^b$, $R^d$, $R^e$, $R^f$, $R^g$ and $R^h$, or is a radical of the formula (VI)

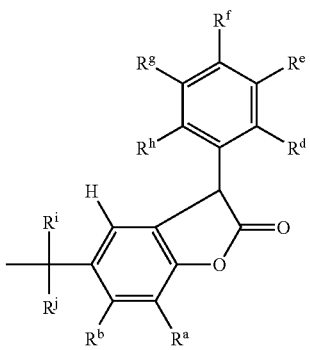

VI in which $R^a$, $R^b$, $R^d$, $R^e$, $R^f$, $R^g$ and $R^h$ are as defined above and $R^i$ and $R^j$ independently of one another are hydrogen or $C_1$–$C_4$-alkyl, where at least two of the radicals $R^d$, $R^e$, $R^f$, $R^g$ and $R^h$ are hydrogen; and C) the at least one sterically hindered piperidine based stabilizer is at least one sterically hindered amine of the formula VII,

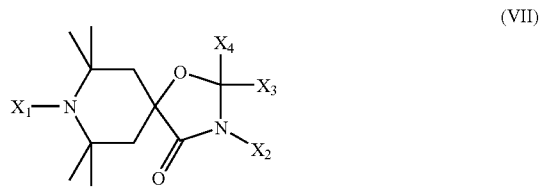

(VII)

in which $X_1$ is hydrogen; a $C_1$–$C_{22}$-alkyl group; an oxygen radical O*; —OH; —NO; —$CH_2CN$; benzyl; allyl; a $C_1$–$C_{30}$-alkoxy group; a $C_5$–$C_{12}$-cycloalkyloxy group; a $C_6$–$C^{10}$-aryloxy group; a $C_7$–$C_{20}$-arylalkyloxy group or a $C_7$–$C_{20}$-arylalkyloxy group where the aryl radical is substituted by a $C_1$–$C_5$-alkyl group, a halogen a nitro group; a $C_3$–$C_{10}$-alkenyl group; a $C_{3-6}$-alkinyl group; a $C_1$–$C_{10}$-acyl group; halogen; or an unsubstituted or $C_1$–$C_4$-alkyl-substituted phenyl radical;

$X_2$ is hydrogen; a [$CH_2$—$CH_2$—$C(O)$—$O$—$X_5$] radical; a [$CH_2$—$C(CH_3)H$—$C(O)$—$O$—$X_5$] radical; or a $C_1$–$C_{22}$-alkyl group;

$X_3$ and $X_4$ independently of one another are hydrogen; an unsubstituted or $C_1$–$C_4$-alkyl-substituted phenyl radical; or a $C_1$–$C_{22}$-alkyl group, where at least one of the two radicals $X_3$ and $X_4$ is a branched $C_4$–$C_{22}$-alkyl group; and in which $X_5$ is a $C_1$–$C_{22}$-alkyl group.

3. A stabilizer composition as claimed in claim 2, wherein $R^a$, $R^b$, $R^d$, $R^e$, $R^f$, $R^g$, and $R^h$ independently of one another are hydrogen; hydroxyl; $C_1$–$C_{12}$-alkyl; or phenyl which is unsubstituted or mono-, di- or trisubstituted by $C_1$–$C_2$-alkyl; $C_7$–$C_9$-phenylalkyl, $C_1$–$C_{12}$-alkoxy or $C_5$–$C_8$-cycloalkyl unsubstituted or mono-, di- or trisubstituted by $C_1$–$C_2$-alkyl; and $R^c$ has one of the meanings given above for $R^a$, $R^b$, $R^d$, $R^e$, $R^f$, $R^g$ and $R^h$ or is a radical of the formula (VI) in which $R^a$, $R^b$, $R^d$, $R^e$, $R^f$, $R^g$ and $R^h$ are as defined above and $R^i$ and $R^j$ independently of one another are hydrogen or $C_1$–$C_2$-alkyl, where at least two of the radicals $R^d$, $R^e$, $R^f$, $R^g$ and $R^h$ are hydrogen;

$X_1$ is hydrogen; a $C_1$–$C_5$-alkyl group; an oxygen radical O*; —OH; —NO; —CH$_2$CN; benzyl; allyl; a $C_1$–$C_{10}$-alkoxy group; a $C_6$–$C_6$-cycloalkyloxy group; a $C_6$–$C^7$-aryloxy group; a $C_7$–$C_{10}$-arylalkyloxy group or a $C_7$–$C_{10}$-arylalkyloxy group where the aryl radical is substituted by a $C_1$–$C_5$-alkyl group, a halogen a nitro group; a $C_3$–$C_6$-alkenyl group; a $C_3$–$^6$-alkinyl group; a $C_1$–$C_5$-acyl group; halogen; or an unsubstituted or $C_1$–$C_2$-alkyl-substituted phenyl radical;

$X_2$ is hydrogen; a [CH$_2$—CH$_2$—C(O)—O—$X_5$] radical; a [CH$_2$—C(CH$_3$)H—C(O)—O—$X_5$] radical; or a $C_1$–$C_{10}$-alkyl group;

$X_3$ and $X_4$ independently of one another are hydrogen; an unsubstituted or $C_1$–$C_2$-alkyl-substituted phenyl radical or a branched $C_4$–$C_{22}$-alkyl group, where at least one of the two radicals $X_3$ and $X_4$ is a branched $C_4$–$C_{10}$-alkyl group; and in which $X_5$ is a $C_{10}$–$C_{16}$-alkyl group.

4. A stabilizer composition as claimed in claim 2, wherein $R^a$, $R^b$, $R^d$, $R^e$, $R^f$, $R^g$, and $R^h$ independently of one another are hydrogen; hydroxyl; $C_1$–$C_6$-alkyl; or phenyl which is unsubstituted or mono-, di- or trisubstituted by $C_1$–$C_2$-alkyl; $C_7$–$C_9$-phenylalkyl, $C_1$–$C_6$-alkoxy or $C_5$–$C_8$-cycloalkyl unsubstituted or mono-, di- or trisubstituted by $C_1$–$C_2$-alkyl; and $R^c$ has one of the meanings given above for $R^a$, $R^b$, $R^d$, $R^e$, $R^f$, $R^g$ and $R_h$, or is a radical of the formula (VI) in which $R^a$, $R^b$, $R^d$, $R^e$, $R^f$, $R^g$ and $R^h$ are as defined above and $R^i$ and $R^j$ independently of one another are hydrogen or $C_1$–$C_2$-alkyl, where at least two of the radicals $R^d$, $R^e$, $R^f$, $R^g$ and $R^h$ are hydrogen;

$X_1$ is hydrogen; a methyl group; an oxygen radical O*; —OH; —NO; —CH$_2$CN; benzyl; allyl; a $C_1$–$C_6$-alkoxy group; a $C_5$–$C_8$-cycloalkyloxy group; a $C_6$-aryloxy group; a $C_3$–$C_6$-alkenyl group; a $C_3$–$^6$-alkinyl group; a $C_1$–$C_5$-acyl group; halogen; an unsubstituted or $C_1$–$C_2$-alkyl-substituted phenyl radical;

$X_2$ is hydrogen; a [CH$_2$—CH$_2$—C(O)—O—$X_5$] radical; a [CH$_2$—C(CH$_3$)H—C(O)—O—$X_5$] radical; or a $C_1$–$C_4$-alkyl group;

$X_3$ and $X_4$ independently of one another are hydrogen, an unsubstituted or $C_1$–$C_2$-alkyl-substituted phenyl radical or a branched $C_4$–$C_6$-alkyl group, where at least one of the two radicals $X_3$ and $X_4$ is a branched $C_4$–$C_6$-alkyl group; and in which $X_5$ is a $C_{12}$–$C_{14}$-alkyl group.

5. A stabiliier composition comprising:

a) tnphenylphosphine, b) 2-phenylbenzofuranone and c) polymer of epichlorhydrin and 2,2,4,4-tetramethyl-7-oxa-3,20-diaza-20-(2,3-epoxi-propyl)-dispiro-[5.1.11.2]-heneicosane-21-one, wherein the weight ratio component a) to component b) to component c) is from 1:0.1:1 to 1:1:3.

6. Process of stabilizing a thermoplastic polymer comprising the step of incorporating a stabilizer composition as claimed in claim 1 in an amount of from 0.01 to 1% by weight into the polymer to be stabilized.

7. A polymer stabilized in accordance with the process of claim 6.

8. A stabilizer composition comprising:

a) a compound of the formula (II)

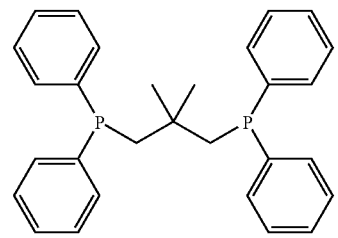

(II)

b) one or more of the compounds (b1), (b2) and (b3); and

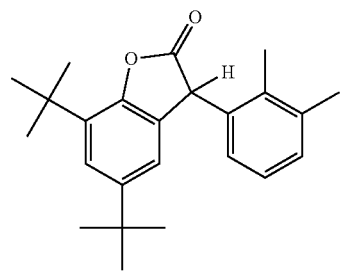

(b1)

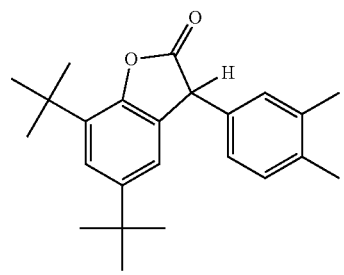

(b2)

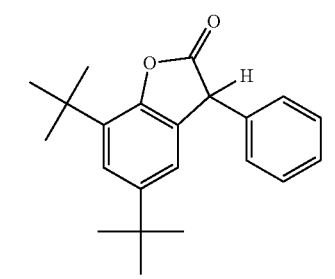

(b3)

c) at least one sterically hindered piperidine based stabilizer.

9. The stabilizer composition as claimed in claim 8, wherein the at least one sterically hindered piperidine based stabilizer is selected from the group consisting of bis(2,2,6,6-tetramethyl-4-piperidinyl)sebacate, bis(1-octyloxy-2,2,6,6-tetramethyl-4-piperidinyl)sebacate, 4-hexadecyloxy-2,2,6,6-tetramethylpiperidine, 4-stearyloxy-2,2,6,6-tetramethylpiperidine, 3-dodecyl-1-(2,2,6,6-tetramethyl-4-piperidyl)pyrrolidine-2,5-dione, 3-dodecyl-1-(1-acetyl -2,2,6,6-tetramethyl-4-piperidyl)pyrrolidine-2,5-dione, the condensation product of 1-(2-hydroxyethyl)-2,2,6,6-tetramethyl-4-hydroxy-piperidine with succinic acid or dialkyl succinate, the condensation product of N,N'-bis(2,2,6,6tetramethyl-4-piperidinyl)-hexa-methylenediamine and 4-tert-octylamino-2,6-dichloro-1,3,5-triazine, the condensation product of N,N'-bis(2,2,6,6-tetramethyl-4-piperidinyl)-hexa-methylenediamine and 4-cyclohexylamino-2,6-dichloro-1,3,5-triazine, the condensation product of N,N'-bis(2,2,6,6-tetramethyl-4piperidinyl)-hexamethylenediamine and 4-morpholino-2,6-dichloro-1,3,5-triazine; the condensation product of 2-chloro -4,6-bis(4-n-butylamino-1,2,2,6,6-penta-methylpiperidyl)-1,3,5-triazine and 1,2-bis-(3-aminopropylamino)ethane, 2,2,4,4-tetramethyl-7-oxa-3,20-diaza-20-(2,3-epoxi-propyl)-dispiro-[5.1.11.2]-heneicosane-21-one, the polymer of epichiorhydrin and 2,2,4,4-tetramethyl-7-oxa-3,20-diaza-20-(2,3-epoxipropyl)-dispiro-[5.1.11.2]-heneicosane-21-one, and mixtures thereof.

10. The stabilizer composition as claimed in claim 8, wherein compound b) is a mixture of the compounds (b1) and (b2),

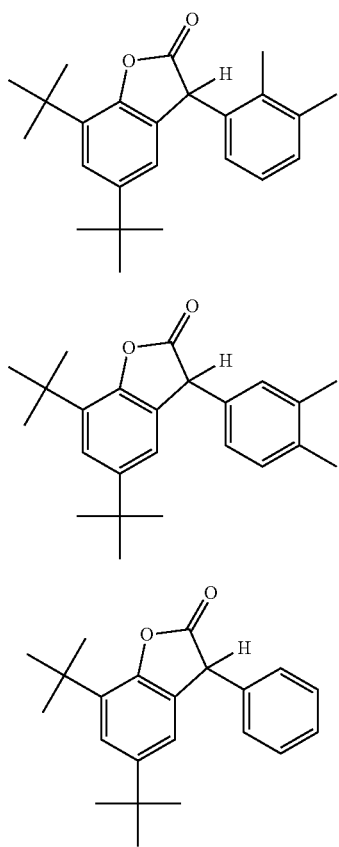

and wherein the at least one sterically hindered piperidine based stabilizer is selected from the group consisting of bis(2,2,6,6-tetramethyl-4-piperidinyl)sebacate, 3-dodecyl-1-(2,2,6,6-tetramethyl-4-piperidyl)pyrrolidine-2,5-dione, the condensation product of 1-(2-hydroxyethyl)-2,2,6,6-tetramethyl-4-hydroxy-piperidine with succinic acid or dialkyl succinate, the condensation product of N,N'-bis(2,2,6,6-tetramethyl-4-piperidinyl)-hexa-methylenediamine and 4-tert -octylamino-2,6-dichloro-1,3,5-triazine, the polymer of epichiorhydrin and 2,2,4,4tetramethyl-7-oxa-3,20-diaza-20-(2,3-epoxi-propyl)-dispiro-[5.1.11.2]-heneicosane-21-one, and mixtures thereof.

11. The stabilizer composition as claimed in claim 8, wherein compound b) is the compound (b3),

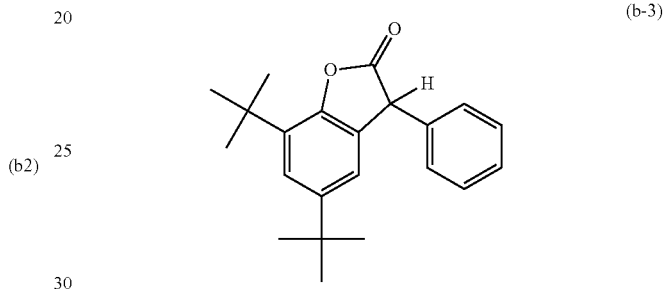

and wherein the at least one sterically hindered piperidine based stabilizer is selected from the group consisting of bis(2,2,6,6-tetramethyl-4-piperidinyl)sebacate, 3-dodecyl-1-(2,2,6,6-tetramethyl-4-piperidyl)pyrrolidine-2,5-dione, the condensation product of 1-(2-hydroxyethyl)-2,2,6,6-tetramethyl-4-hydroxy-piperidine with succinic acid or dialkyl succinate, the condensation product of N,N'-bis(2,2,6,6-tetramethyl-4-piperidinyl)-hexa-methylenediamine and 4-tert -octylamino-2,6-dichloro-1,3,5-triazine, the polymer of epichiorhydrin and 2,2,4,4tetramethyl-7-oxa-3,20-diaza-20-(2,3-epoxi-propyl)-dispiro-5.1.11.2]-heneicosane-21-one, and mixtures thereof.

* * * * *